United States Patent
Ridray et al.

(10) Patent No.: US 10,995,700 B2
(45) Date of Patent: May 4, 2021

(54) JET ENGINE COMPRISING A NACELLE EQUIPPED WITH REVERSER FLAPS

(71) Applicant: Airbus Operations (S.A.S.), Toulouse (FR)

(72) Inventors: Frédéric Ridray, L'isle Jourdain (FR); Lionel Czapla, Cornebarrieu (FR); Frédéric Piard, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 512 days.

(21) Appl. No.: 16/007,761

(22) Filed: Jun. 13, 2018

(65) Prior Publication Data

US 2018/0372025 A1    Dec. 27, 2018

(30) Foreign Application Priority Data

Jun. 14, 2017 (FR) ...................................... 1755332

(51) Int. Cl.
*F02K 1/72* (2006.01)
*F02K 1/76* (2006.01)
(Continued)

(52) U.S. Cl.
CPC ................ *F02K 1/72* (2013.01); *B64D 29/06* (2013.01); *B64D 33/04* (2013.01); *F02K 1/763* (2013.01)

(58) Field of Classification Search
CPC ... F02K 1/72; F02K 1/763; F02K 1/70; F02K 1/62; F02K 1/625; B64D 33/04; B64D 29/06; Y02T 50/60
See application file for complete search history.

(56) References Cited

U.S. PATENT DOCUMENTS

| 3,815,357 A | 6/1974 | Brennan |
| 3,829,020 A * | 8/1974 | Stearns ................... F02K 1/827 239/265.13 |

(Continued)

FOREIGN PATENT DOCUMENTS

| EP | 3 034 848 A1 | 6/2016 |
| EP | 3 103 955 A1 | 12/2016 |

(Continued)

OTHER PUBLICATIONS

French Search Report for French Application No. 1755332 dated Feb. 22, 2018.

(Continued)

*Primary Examiner* — Assres H Woldemaryam
(74) *Attorney, Agent, or Firm* — Jenkins, Wilson, Taylor & Hunt, P.A.

(57) ABSTRACT

A jet engine including a motor with a fan casing and a nacelle which includes a mobile cowl and a main slider that is mobile in translation between an advanced position and a retracted position in which the mobile cowl and the fan casing define, between them, a window. The nacelle also includes reverser flaps and exterior flaps, each one being mounted articulated on the main slider between a stowed position in which it obstructs the window and a deployed position in which it does not obstruct the window, a secondary slider that is mobile in translation on the main slider between a first position and a second position, a transmission system making each reverser flap and exterior flap pass from the stowed position to the deployed position when the secondary slider passes from the first position to the second position, and a set of actuators that bring about a movement in translation of the main slider and of the secondary slider.

6 Claims, 4 Drawing Sheets

(51) Int. Cl.
*B64D 33/04* (2006.01)
*B64D 29/06* (2006.01)

(56) References Cited

U.S. PATENT DOCUMENTS

| | | | |
|---|---|---|---|
| 6,895,742 B2* | 5/2005 | Lair | F02K 1/763 |
| | | | 60/226.2 |
| 8,720,818 B1 | 5/2014 | Teulou et al. | |
| 8,793,973 B2 | 8/2014 | Vauchel | |
| 9,856,825 B2 | 1/2018 | Gallet | |
| 9,915,226 B2* | 3/2018 | Gormley | F02K 1/72 |
| 10,030,608 B2* | 7/2018 | Roberts | F02K 1/72 |
| 10,690,088 B2 | 6/2020 | Ridray et al. | |
| 2012/0138707 A1* | 6/2012 | Vauchel | F02K 1/763 |
| | | | 239/265.29 |
| 2016/0131082 A1* | 5/2016 | Gormley | F02K 1/72 |
| | | | 239/265.19 |
| 2016/0363097 A1* | 12/2016 | Foutch | F02K 1/70 |
| 2018/0274484 A1 | 9/2018 | Ridray et al. | |

FOREIGN PATENT DOCUMENTS

| | | |
|---|---|---|
| EP | 3 103 995 A2 | 12/2016 |
| EP | 3 165 752 A2 | 5/2017 |
| FR | 2 935 444 A1 | 3/2010 |
| FR | 2 946 094 A1 | 12/2010 |
| WO | WO 2013/021136 A1 | 2/2013 |

OTHER PUBLICATIONS

French Search Report for French Application for No. 1752385 dated Dec. 1, 2017.
Notice of Allowance and Interview Summary for U.S. Appl. No. 15/926,757 dated Feb. 24, 2020.

* cited by examiner

JET ENGINE COMPRISING A NACELLE EQUIPPED WITH REVERSER FLAPS

CROSS-REFERENCE TO RELATED APPLICATION

This patent application claims priority to French patent application FR 17 55332, filed on Jun. 14, 2017, the entire disclosure of which is incorporated by reference herein.

TECHNICAL FIELD

The disclosure herein relates to a turbofan which comprises a nacelle equipped with a plurality of reverser flaps, and to an aircraft comprising at least one such turbofan.

BACKGROUND

An aircraft includes a fuselage to each side of which is fixed a wing. Under each wing is suspended at least one turbofan. Each turbofan is fixed under the wing by a pylon that is fixed between the structure of the wing and the structure of the turbofan. The turbofan comprises a motor and a nacelle that is fixed around the motor.

The nacelle comprises a plurality of reverser flaps, each one being mobile in rotation on the structure of the nacelle between a stowed position in which it becomes continuous with the exterior surface of the nacelle and a deployed position in which it opens a window in the wall of the nacelle to expel the air of the bypass flow to the exterior of the nacelle. Generally, the window houses a cascade which serves to redirect the bypass air flow forwards so as to produce reverse thrust.

The movement of each reverser flap is controlled by one or more actuators, which are relatively heavy.

Although the mechanism of a reverser flap of this kind is entirely satisfactory, it is desirable to find different mechanisms.

SUMMARY

The subject matter herein has an object of disclosing a turbofan comprising a nacelle equipped with a plurality of reverser flaps with a different opening mechanism.

To that end, the disclosure herein proposes a turbofan comprising a motor and a nacelle, surrounding the motor, which comprises a fan casing, in which a duct for a bypass flow is disposed, delimited or defined between the nacelle and the motor, and in which a flow of air flows in a flow direction, the nacelle comprising:
- a fixed structure attached to the fan casing,
- a mobile assembly having a mobile cowl and a main slider, the mobile cowl being fixed to and downstream of the main slider, relative to the flow direction, the main slider being mobile in translation, on the fixed structure, in a direction of translation between an advanced position in which the main slider is positioned such that the mobile cowl is moved close to the fan casing and a retracted position in which the main slider is positioned such that the mobile cowl is moved away from the fan casing so as to define, between them, an open window between the duct and the exterior of the nacelle,
- a plurality of reverser flaps arranged inside the nacelle, each one being mounted articulated, by a downstream edge relative to the flow direction, on the main slider between a stowed position in which it obstructs a zone of the window and a deployed position in which it does not obstruct the zone of the window and extends towards the motor,
- a plurality of exterior flaps that are arranged outside the nacelle, where each exterior flap is mounted articulated, by a downstream edge relative to the flow direction, on the main slider between a stowed position in which it obstructs a zone of the window and a deployed position in which it does not obstruct the zone of the window and extends towards the exterior of the nacelle,
- a secondary slider mounted mobile in translation parallel to the direction of translation on the main slider between a first position and a second position,
- a first transmission system designed to make each reverser flap pass from the stowed position to the deployed position at the same time as the secondary slider passes from the first position to the second position and vice versa,
- a second transmission system designed to make each exterior flap pass from the stowed position to the deployed position at the same time as the secondary slider passes from the first position to the second position and vice versa, and
- a set of actuators designed to bring about, from the advanced position of the main slider, a movement in translation of the main slider to the retracted position, and then the movement in translation of the secondary slider from the first position to the second position and vice versa.

A jet engine of this kind makes it possible, inter alia, to reduce the number of actuators used for actuating the reverser flaps. Furthermore, a jet engine of this kind does not comprise elements such as cascades to redirect the flow of air flowing through the bypass duct towards the front of the nacelle. Indeed, the flow of air is redirected forward only by the reverser flaps and the exterior flaps in the deployed position.

Advantageously, each exterior flap is mounted opposite a reverser flap.

Advantageously, in the retracted position, the main slider is pressed against the fixed structure of the nacelle.

Advantageously, the main slider has stops that are angularly distributed around the perimeter of the main slider, and, for each stop, the fan casing has a counter-stop against which the stop comes to abut in the retracted position.

Advantageously, the main slider has stops that are angularly distributed around the perimeter of the main slider, and, for each stop, a front frame of the fixed structure has a counter-stop against which the stop comes to abut in the retracted position.

The subject matter herein also discloses an aircraft comprising at least one turbofan in accordance with one of the above variants.

BRIEF DESCRIPTION OF THE DRAWINGS

The features of the disclosure herein mentioned above, along with others, will become more clearly apparent on reading the following description of one exemplary embodiment, the description being given with reference to the appended drawings, in which.

DETAILED DESCRIPTION

In the following description, the terms relating to a position refer to the direction of flow of the air in a jet engine which therefore flows from the front to the rear of the aircraft.

Figure 1:
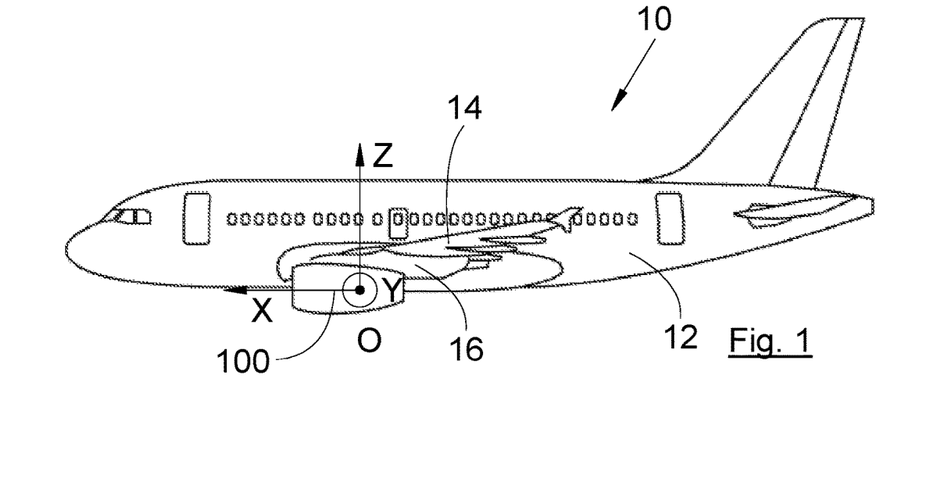
FIG. 1 is a side view of an aircraft comprising a jet engine according to the disclosure herein.

FIG. 1 shows an aircraft 10 that comprises a fuselage 12, to each side of which is fixed a wing 14 that bears at least one turbofan 100 according to the disclosure herein. The turbofan 100 is fixed under the wing 14 by a pylon 16.

Figure 2:
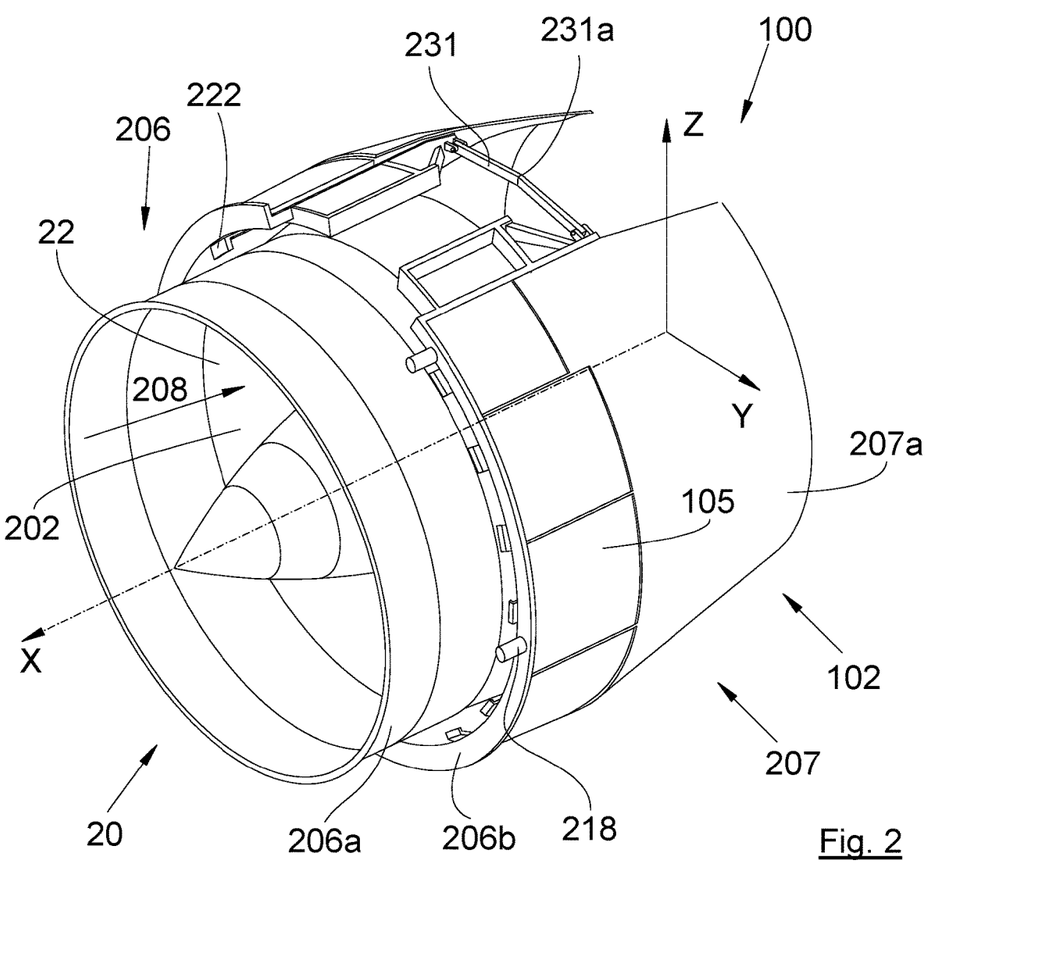
FIG. 2 is a perspective view of the jet engine according to the disclosure herein.

FIG. 2 shows the turbofan 100 which has a nacelle 102 and a motor 20 which is housed inside the nacelle 102 and comprises a fan casing 206a. In this case, the motor 20 is represented by its front cone and its fan 22 inside the air intake of the nacelle 102.

In the following description, and by convention, X denotes the longitudinal axis of the turbofan 100 that is parallel to the longitudinal or roll axis of the aircraft 10 oriented positively towards the front of the aircraft 10, Y denotes the transverse axis parallel to the pitch axis of the aircraft which is horizontal when the aircraft is on the ground, and Z denotes the vertical axis parallel to the yaw axis when the aircraft is on the ground, these three directions X, Y and Z being mutually orthogonal and forming an orthonormal frame of reference the origin of which is the centre of gravity of the turbofan 100.

Figure 3:
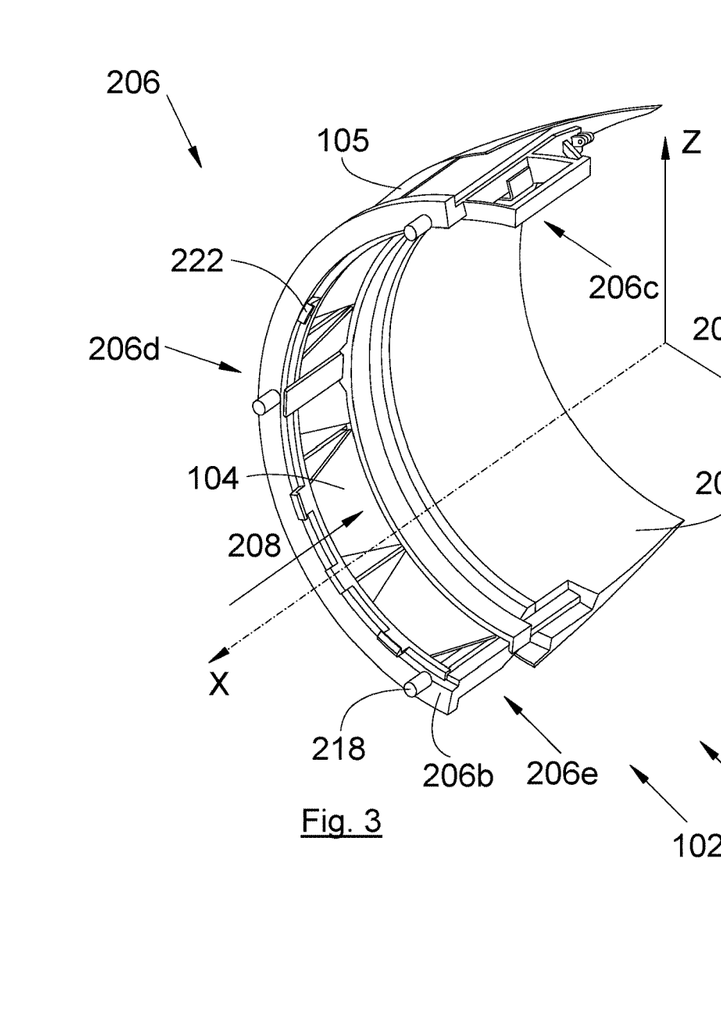
FIG. 3 is a perspective view of a section through a nacelle according to the disclosure herein in the advanced position.
Figure 4:
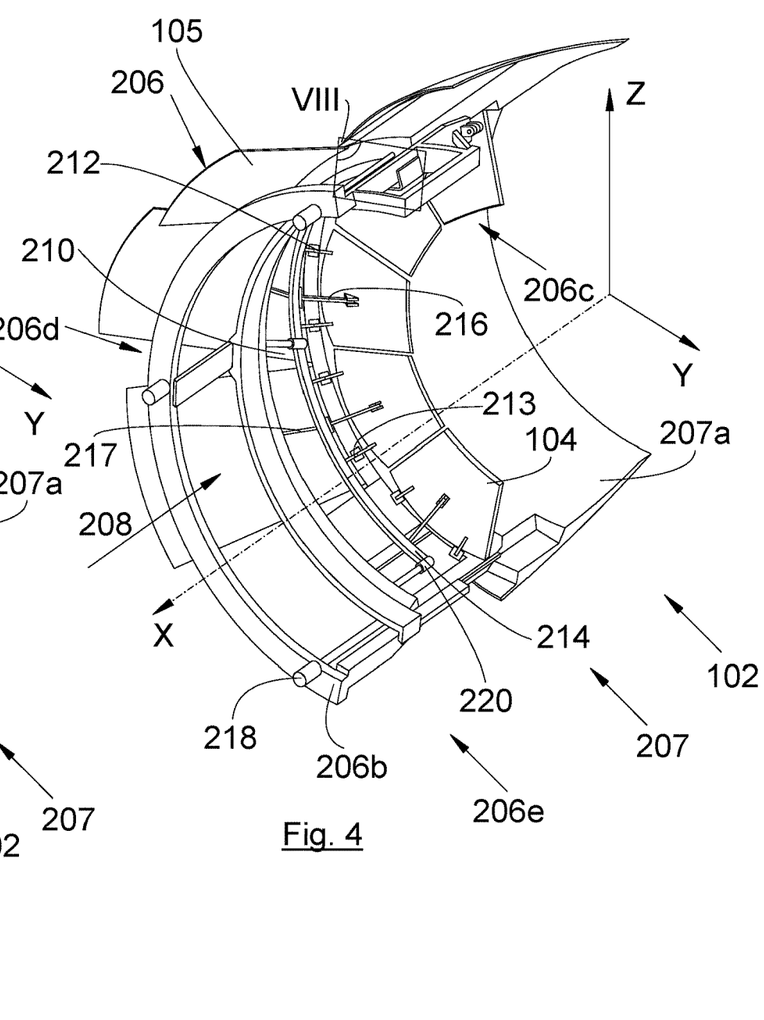
FIG. 4 is a perspective view identical to that of FIG. 3 in the retracted and deployed position.
Figure 5:
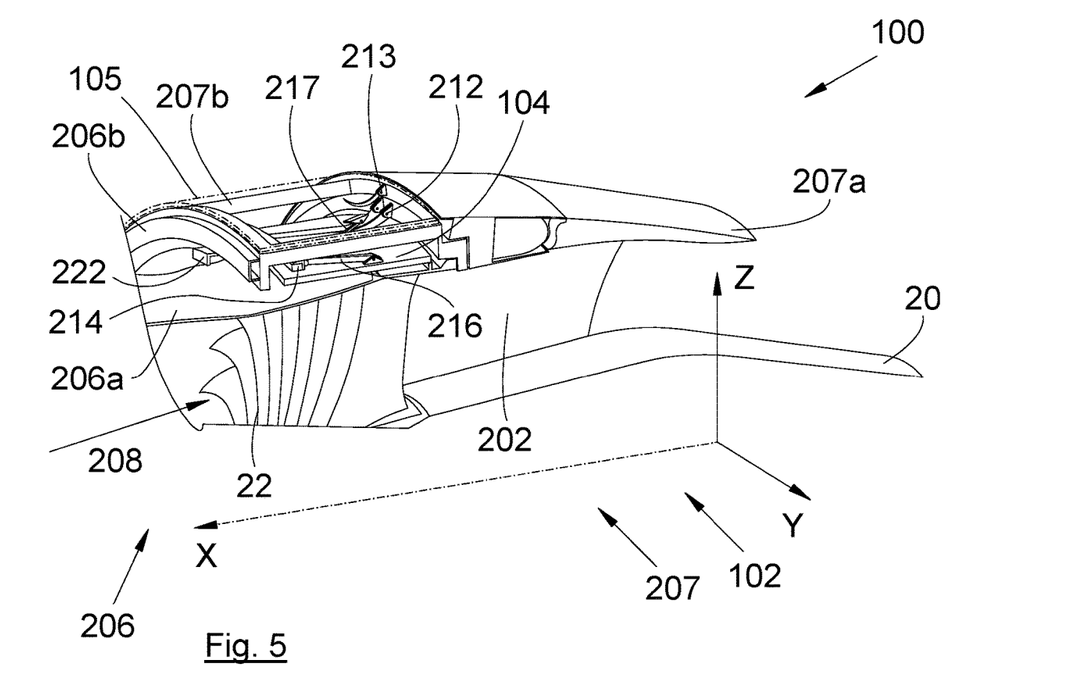
FIG. 5 is a perspective view of a section through the jet engine in the advanced position.
Figure 6:
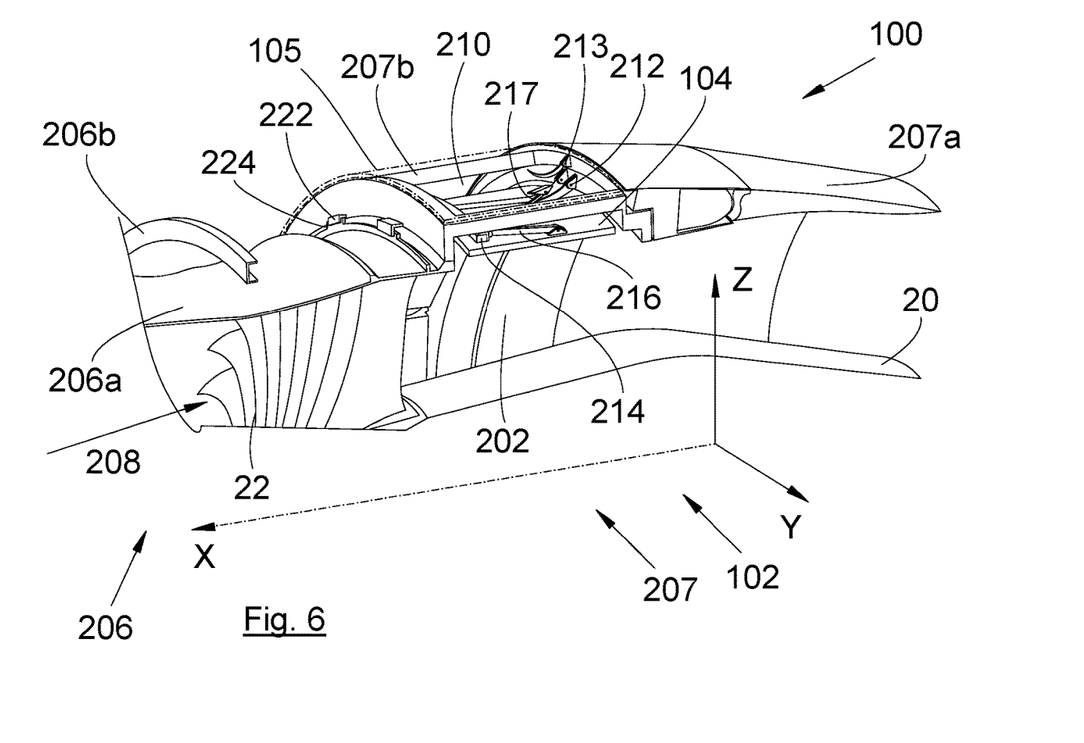
FIG. 6 is a perspective view identical to that of FIG. 5 in the retracted and stowed position.
Figure 7:
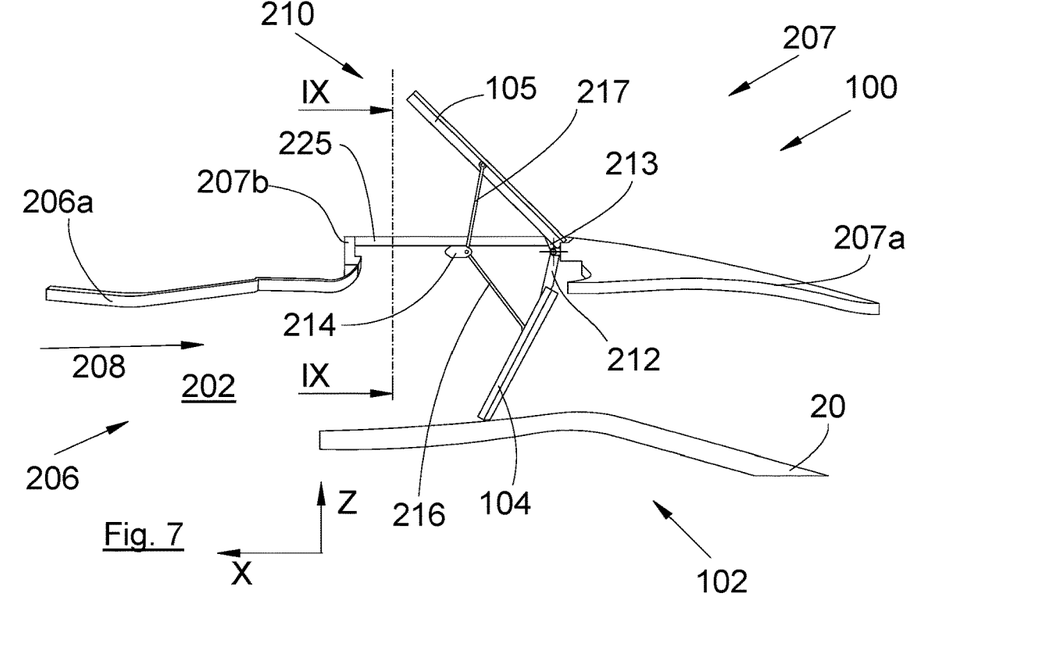
FIG. 7 is a view in section of the jet engine in the retracted and deployed position.

FIG. 3 and FIG. 4 show part of the nacelle 102, and FIGS. 5 through 7 show part of the turbofan 100.

As shown in FIGS. 5 through 7, the turbofan 100 has, between the nacelle 102 and the motor 20, a duct 202 in which flows the bypass flow 208 coming from the air intake and through the fan 22, and which therefore flows in the flow direction from upstream to downstream.

The nacelle 102 has a fixed structure 206 that is mounted fixed on the fan casing 206a. The fixed structure 206 consists of or comprises a front frame 206b mounted around the fan casing 206a. The front frame 206b is connected to the fan casing 206a by the 6 o'clock beam 206e, the 3 o'clock-9 o'clock beam 206d and the 12 o'clock beam 206c. The front frame 206b, as well as the 6 o'clock beam 206e, the 9 o'clock beam 206d and the 12 o'clock beam 206c, can be integral parts of the fixed structure 206 of the nacelle 102.

The fixed structure 206 of the nacelle 102 is designed to be fixed only to the fan casing 206a. More particularly, the nacelle 102 is fixed to the fan casing 206a by the intermediary of the 6 o'clock beam 206e, the 3 o'clock-9 o'clock beam 206d and the 12 o'clock beam 206c.

The crosspiece 231 located at 12 o'clock makes it possible to connect, at 12 o'clock, the left-hand fixed structure to the right-hand fixed structure, more particularly the left-hand 12 o'clock beam 206c to the right-hand 12 o'clock beam 206c.

It is also possible to add one or more movement limiters 231a connected to the pylon 16, forming a Y-shaped stop having a certain play corresponding to the displacement that is to be tolerated.

The nacelle 102 has a mobile assembly 207 having a mobile cowl 207a forming the walls of the nozzle and a main slider 207b. In this case, the main slider 207b is in the form of a cylinder having openwork walls. The mobile cowl 207a is fixed to and downstream of the main slider 207b, relative to the flow direction.

The main slider 207b is mounted mobile in translation in a direction of translation that is largely parallel to the longitudinal axis X on the fixed structure 206 of the nacelle 102, and more particularly in this case on the 12 o'clock beam 206c and the 6 o'clock beam 206e.

The main slider 207b is made to translate by systems of slides between the front frame 206b and the main slider 207b.

Figures 8, 9, 10:
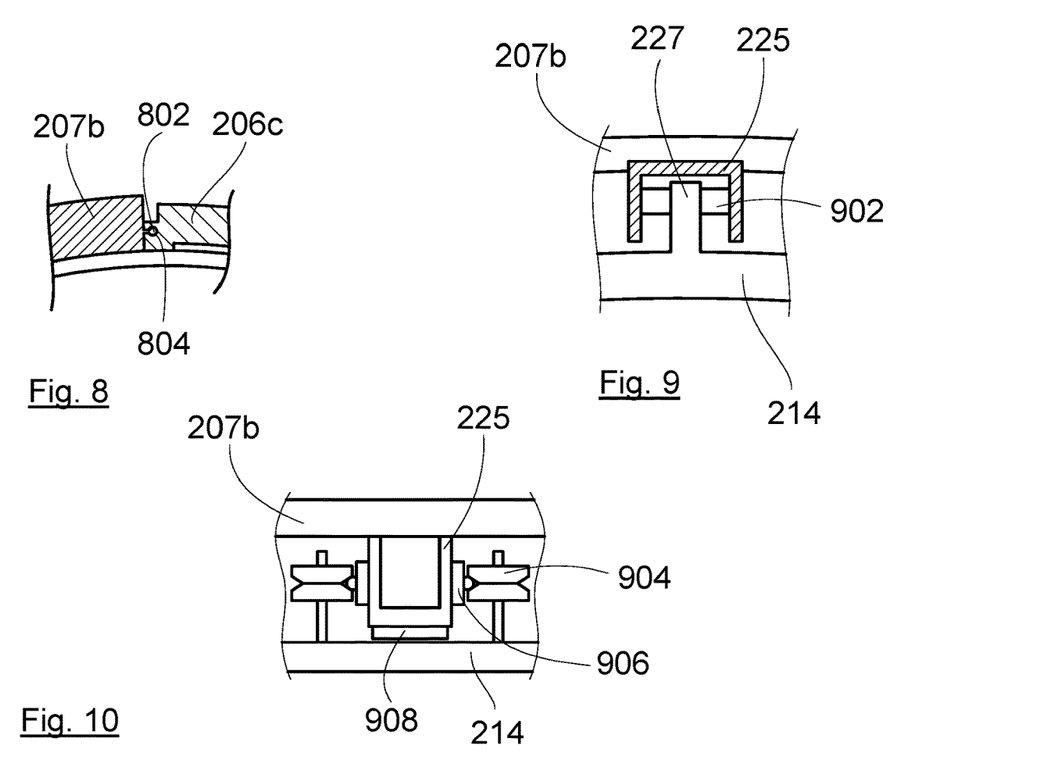
FIG. 8 shows a view in section in plane VIII of FIG. 4.
FIG. 9 shows a view in section along the line IX-IX of FIG. 7.
FIG. 10 shows a view similar to that of FIG. 9 for a particular embodiment.

FIG. 8 shows an example of a particular embodiment of the system of slides between the 12 o'clock beam 206c and the main slider 207b. This embodiment is applicable to the 3 o'clock-9 o'clock and 6 o'clock slide connections. In this embodiment, the main slider 207b has a rib 802 in the form of a straight bead, and the 12 o'clock beam 206c has a groove 804, the shape of which is suitable to allow the rib 802 to slide.

The main slider 207b is mobile between an advanced position (FIGS. 2, 3 and 5) and a retracted position (FIGS. 4, 6 and 7) and vice versa. In the advanced position, the main slider 207b is positioned as far forward as possible, with respect to the flow direction, such that the mobile cowl 207a is moved close to the fan casing 206a. In the retracted position, the main slider 207b is positioned as far aft as possible, with respect to the flow direction, such that the mobile cowl 207a is moved away from the fan casing 206a.

In the advanced position, the mobile cowl 207a and the fan casing 206a extend in line with one another so as to define the outer surface of the duct 202.

In the retracted position, the mobile cowl 207a and the fan casing 206a are spaced apart from one another and define, between them, an open window 210 between the duct 202 and the exterior of the nacelle 102. That is to say that the air from the bypass flow 208 passes through the window 210 to the exterior of the turbofan 100 and is oriented towards the front of the nacelle 102 by the exterior flaps 105, making it possible to produce reverse thrust.

The fan casing 206a forms the upstream boundary of the window 210 with respect to the longitudinal axis X, and the mobile cowl 207a forms the downstream boundary of the window 210 with respect to the longitudinal axis X.

The nacelle 102 comprises a plurality of reverser flaps 104 distributed over the periphery of and in the interior of the nacelle 102 as a function of the angular opening of the window 210 about the longitudinal axis X.

Each reverser flap 104 is mounted so as to be articulated, on the main slider 207b, between a stowed position (FIGS. 2, 3, 5 and 6) and a deployed position (FIGS. 4 and 7), and vice versa. Passage from the stowed position to the deployed position is brought about by rotation of the reverser flap 104 towards the interior of the jet engine 100.

The stowed position can be adopted when the main slider 207b is in the advanced position or the retracted position. The deployed position can be adopted only when the main slider 207b is in the retracted position.

In the stowed position, each reverser flap 104 obstructs a zone of the openwork portion of the main slider 207b when the latter is in the advanced position, and the same zone of the openwork portion of the main slider 207b and a zone of the window 210 when the main slider 207b is in the retracted position. In the deployed position, the reverser flap 104 does not obstruct the zone of the window 210, or the openwork portion of the main slider 207b, allowing the bypass flow 208 to pass through, and the reverser flap 104 extends towards the motor 20.

Thus, in the stowed position, each reverser flap 104 is generally in line with the mobile cowl 207a and, in the deployed position, each reverser flap 104 is positioned across the duct 202 and deflects at least part of the bypass flow 208 to the outside through the window 210, the flow is oriented forwards by the exterior flaps 105.

In the advanced position, each reverser flap 104 is positioned outside the fan casing 206a.

Each reverser flap 104 is articulated, by a downstream edge relative to the flow direction, to the downstream portion of the main slider 207b on hinges 212 fixed to the main slider 207b while the opposite free edge is positioned in the upstream direction in the stowed position and towards the motor 20 in the deployed position.

The nacelle 102 comprises a plurality of exterior flaps 105 that are shown transparently in FIGS. 5 and 6. The exterior flaps 105 are distributed over the periphery of and at the exterior of the nacelle 102 as a function of the angular opening of the window 210 about the longitudinal axis X. The exterior flaps 105 are arranged at the exterior relative to the reverser flaps 104. According to one particular embodiment, each exterior flap 105 is mounted opposite a reverser flap 104.

Each exterior flap 105 is mounted so as to be articulated, on the main slider 207b, between a stowed position (FIGS. 2, 3, 5 and 6) and a deployed position (FIGS. 4 and 7), and vice versa. Passage from the stowed position to the deployed position is brought about by rotation of the exterior flap 105 towards the exterior of the jet engine 100. The articulations of the exterior flaps 105 are overall opposite articulations of the reverser flaps 104 and, as shown in FIG. 7, the reverser flaps 104 and the exterior flaps 105 are largely continuous when both deployed.

The stowed position can be adopted when the main slider 207b is in the advanced position or the retracted position. The deployed position can be adopted only when the main slider 207b is in the retracted position. The deployed—or stowed, at the case may be—position of the exterior flaps 105 is synchronized with the deployed—or stowed, at the case may be—position of the reverser flaps 104.

In the stowed position, each exterior flap 105 obstructs a zone of the openwork portion of the main slider 207b when the latter is in the advanced position, and the same zone of the openwork portion of the main slider 207b and a zone of the window 210 when the main slider 207b is in the retracted position. In the deployed position, the exterior flap 105 does not obstruct the zone of the window 210, or the openwork portion of the main slider 207b, and extends towards the exterior of the nacelle 102, allowing the bypass flow 208 to pass through.

Thus, in the stowed position, each exterior flap 105 is overall in line with the mobile valve 207a and, in the deployed position, each exterior flap 105 opens outwards and deflects that part of the bypass flow 208 previously deflected through the window 210 by the reverser flaps 104.

In the advanced position, each exterior flap 105 is positioned outside the reverser flaps 104.

Each exterior flap 105 is articulated, by a downstream edge relative to the flow direction, to the downstream portion of the main slider 207b on hinges 213 fixed to the main slider 207b while the opposite free edge is positioned in the upstream direction in the stowed position and outwards in the deployed position.

The mobile assembly 207 also has a secondary slider 214 which is mounted mobile in translation in a direction parallel to the direction of translation on the main slider 207b. Thus, the secondary slider 214 is mobile between a first position and a second position.

The mobile assembly 207 also has a first transmission system 216 which, for each reverser flap 104, takes in this case the form of a link that is articulated at one end to the reverser flap 104 and articulated at the other end to the secondary slider 214.

In the same way, the mobile assembly 207 also has a second transmission system 217 which, for each exterior flap 105, takes in this case the form of a link that is articulated at one end to the exterior flap 105 and articulated at the other end to the secondary slider 214.

There is therefore one secondary slider 214 for multiple reverser flaps 104 and exterior flaps 105.

The first transmission system 216 is designed to make each reverser flap 104 pass from the stowed position to the deployed position at the same time as the secondary slider 214 passes from the first position to the second position so as to reveal the reverser flaps 104, and vice versa.

The second transmission system 217 is designed to make each exterior flap 105 pass from the stowed position to the deployed position at the same time as the secondary slider 214 passes from the first position to the second position so as to reveal the exterior flaps 105, and vice versa.

In the embodiment of the disclosure herein presented here, the first position comprises or consists in moving the secondary slider 214 forwards, while the second position comprises or consists in moving the secondary slider 214 aft.

The secondary slider 214 is made to translate by systems of slides between the main slider 207b and the secondary slider 214, which can for example take the same form as that described in FIG. 8. The secondary slider 214 is guided radially by the intermediary of rollers or blocks.

FIG. 9 shows an example of one particular embodiment of the guiding of the secondary slider 214. In this case, the main slider 207b has U-shaped profiles 225 which extend parallel to the longitudinal axis X and which are open towards the inside and the secondary slider 214 has a clevis 227 that extends radially into one of the U-shaped profiles 225 and bears blocks or rollers 902 between the clevis 227 and each of the flanks of the U-shaped profile 225.

FIG. 10 shows an example of one particular embodiment of the guiding of the secondary slider 214. In this case, the main slider 207b has U-shaped profiles 225 which extend parallel to the longitudinal axis X and which are open towards the outside and the secondary slider 214 has two axle+roller assemblies 904, on either side of the main slider 207b and fixed to the secondary slider 214. The U-shaped profile 225 (which may have a different shape, for example an I-shape or a T-shape) bears blocks 908 for reacting the radial forces from the secondary slider 214, and rails 906 making it possible to react the forces perpendicular to the radial forces from the secondary slider 214. The combination of the rails 906 and the rollers 904 makes it possible to guide the secondary slider 214 as it translates along the longitudinal axis X.

The passage from the advanced position of the main slider 207b to the position in which the main slider 207b is retracted and the reverser flaps 104 and the exterior flaps 105 are deployed thus comprises or consists in, from the advanced position of the main slider 207b and thus from the stowed positions of the reverser flaps 104 and exterior flaps 105, retracting the main slider 207b by translation with respect to the front frame 206b in order to reach the retracted position for the main slider 207b and the stowed positions of the reverser flaps 104 and exterior flaps 105, in moving the secondary slider 214 from the first position to the second position in order to make the reverser flaps 104 and the exterior flaps 105 pass from the stowed position to the deployed position.

The reverse movement makes it possible to return to the advanced position.

The nacelle 102 also comprises a set of actuators 218 and 220 that bring about the movement in translation of the main slider 207b and of the secondary slider 214. Each actuator 218, 220 is controlled by a control unit, for example of the processor type, which controls the movements in one direction or the other according to the requirements of the aircraft 10.

The set of actuators 218, 220 is thus designed to bring about, from the advanced position of the main slider 207b and thus from the stowed positions of the reverser flaps 104 and exterior flaps 105, a movement in translation of the main slider 207b to the retracted position, and then the movement in translation of the secondary slider 214 from the first position to the second position and vice versa. During the movement of the main slider 207b, the secondary slider 214 which is borne by the main slider 207b follows the same movement.

Each actuator 218, 220 may for example take the form of a double-action telescopic-stem jack (two working directions). There are thus multiple jacks, of which each cylinder is fixed to the front frame 206b and more generally to the fixed structure 206 of the nacelle 102, and of which the end of each one of the first stems is fixed to the main slider 207b, and of which the end of each one of the second stems is fixed to the secondary slider 214.

Each actuator 218, 220 may for example take the form of a double-action jack (two working directions). There are thus first jacks 218, each one having a cylinder fixed to the front frame 206b, and more generally to the fixed structure 206 of the nacelle 102, and a stem fixed to the main slider 207b. There are thus second jacks 220, each one having a cylinder fixed to the main slider 207b and a stem fixed to the secondary slider 214.

Each actuator 218, 220 may for example take the form of a motor that meshes with a rack. There are thus first motors, each one being fixed to the front frame 206b and meshing with a rack that is fixed to the main slider 207b. There are thus second motors, each one being fixed to the main slider 207b and meshing with a rack that is fixed to the secondary slider 214.

In the embodiment presented here, there are three actuators 218 for each half of the nacelle 102 and for moving the main slider 207b, and three actuators 220 (only two are shown in FIG. 4) for each half of the nacelle 102 and for moving the secondary slider 214.

The number of actuators 218, 220 is therefore reduced compared to the number of actuators of the prior art, resulting in a saving in terms of weight.

In order to avoid any deformation of the main slider 207b during the movement of the secondary slider 214, the main slider 207b is pressed against the fixed structure 206 of the nacelle 102 in the retracted position. To that end, the actuators 218 that move the main slider 207b move it until it abuts against the fixed structure 206 of the nacelle 102, and hold it in this position until there is a command for the return to the advanced position. Such a placement in abutment makes it possible to temporarily fix the main slider 207b.

In the embodiment of the disclosure herein shown here, the main slider 207b has stops 222 that are angularly distributed around the perimeter of the main slider 207b, and, for each stop 222, the fan casing 206a or the front frame 206b of the fixed structure 206 has a counter-stop 224 against which the stop 222 comes to abut in the retracted position.

The disclosure herein has been more particularly described in the case of a nacelle under a wing but can be applied to a nacelle located at the rear of the fuselage.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan comprising a motor and a nacelle, surrounding the motor, which comprises a fan casing, in which a duct for a bypass flow is defined between the nacelle and the motor and in which a flow of air can flow in a flow direction, the nacelle comprising:
    a fixed structure attached to the fan casing;
    a mobile assembly having a mobile cowl and a main slider, the mobile cowl being fixed to and downstream of the main slider, relative to the flow direction, the main slider being mobile in translation, on the fixed structure, in a direction of translation between an advanced position in which the main slider is positioned such that the mobile cowl is moved close to the fan casing and a retracted position in which the main slider is positioned such that the mobile cowl is moved away from the fan casing so as to define, between them, an open window between the duct and an exterior of the nacelle;
    a plurality of reverser flaps arranged inside the nacelle, each of the reverser flaps being mounted articulated, by a downstream edge relative to the flow direction, on the main slider between a stowed position in which the reverser flap obstructs a zone of the window and a deployed position in which the reverser flap does not obstruct the zone of the window and extends towards the motor;
    a plurality of exterior flaps that are arranged outside the nacelle, where each exterior flap is mounted articulated, by a downstream edge relative to the flow direction, on the main slider between a stowed position in which the exterior flap obstructs a zone of the window and a deployed position in which the exterior flap does not obstruct the zone of the window and extends towards the exterior of the nacelle;
    a secondary slider mounted mobile in translation parallel to the direction of translation of the main slider between a first position and a second position;

a first transmission system to make each reverser flap pass from the stowed position to the deployed position at the same time as the secondary slider passes from the first position to the second position and vice versa;

a second transmission system to make each exterior flap pass from the stowed position to the deployed position at the same time as the secondary slider passes from the first position to the second position and vice versa; and a set of actuators to bring about, from the advanced position of the main slider, a movement in translation of the main slider to the retracted position, and then the movement in translation of the secondary slider from the first position to the second position and vice versa, wherein, in the retracted position, the main slider is pressed against the fixed structure of the nacelle, and wherein the main slider has stops that are angularly distributed around a perimeter of the main slider, and wherein, for each stop, the fan casing has a counter-stop against which the stop comes to abut in the retracted position.

2. The turbofan according to claim 1, wherein each exterior flap is mounted opposite a reverser flap.

3. An aircraft comprising at least one turbofan according to claim 1.

4. A turbofan comprising a motor and a nacelle, surrounding the motor, which comprises a fan casing, in which a duct for a bypass flow is defined between the nacelle and the motor and in which a flow of air can flow in a flow direction, the nacelle comprising:

a fixed structure attached to the fan casing;

a mobile assembly having a mobile cowl and a main slider, the mobile cowl being fixed to and downstream of the main slider, relative to the flow direction, the main slider being mobile in translation, on the fixed structure, in a direction of translation between an advanced position in which the main slider is positioned such that the mobile cowl is moved close to the fan casing and a retracted position in which the main slider is positioned such that the mobile cowl is moved away from the fan casing so as to define, between them, an open window between the duct and an exterior of the nacelle;

a plurality of reverser flaps arranged inside the nacelle, each of the reverser flaps being mounted articulated, by a downstream edge relative to the flow direction, on the main slider between a stowed position in which the reverser flap obstructs a zone of the window and a deployed position in which the reverser flap does not obstruct the zone of the window and extends towards the motor;

a plurality of exterior flaps that are arranged outside the nacelle, where each exterior flap is mounted articulated, by a downstream edge relative to the flow direction, on the main slider between a stowed position in which exterior flap obstructs a zone of the window and a deployed position in which the exterior flap does not obstruct the zone of the window and extends towards the exterior of the nacelle;

a secondary slider mounted mobile in translation parallel to the direction of translation of the main slider between a first position and a second position;

a first transmission system to make each reverser flap pass from the stowed position to the deployed position at the same time as the secondary slider passes from the first position to the second position and vice versa;

a second transmission system to make each exterior flap pass from the stowed position to the deployed position at the same time as the secondary slider passes from the first position to the second position and vice versa; and a set of actuators to bring about, from the advanced position of the main slider, a movement in translation of the main slider to the retracted position, and then the movement in translation of the secondary slider from the first position to the second position and vice versa, wherein, in the retracted position, the main slider is pressed against the fixed structure of the nacelle, and wherein the main slider has stops that are angularly distributed around a perimeter of the main slider, and wherein, for each stop, a front frame of the fixed structure has a counter-stop against which the stop comes to abut in the retracted position.

5. The turbofan according to claim 4, wherein each exterior flap is mounted opposite a reverser flap.

6. An aircraft comprising at least one turbofan according to claim 4.

* * * * *